(12) United States Patent
Kolavennu et al.

(10) Patent No.: US 10,516,965 B2
(45) Date of Patent: Dec. 24, 2019

(54) HVAC CONTROL USING GEOFENCING

(71) Applicant: Ademco Inc., Golden Valley, MN (US)

(72) Inventors: Soumitri Kolavennu, Blaine, MN (US); Kevin L. Weirich, Plymouth, MN (US)

(73) Assignee: Ademco Inc., Golden Valley, MN (US)

( * ) Notice: Subject to any disclaimer, the term of this patent is extended or adjusted under 35 U.S.C. 154(b) by 277 days.

(21) Appl. No.: 14/938,642

(22) Filed: Nov. 11, 2015

(65) Prior Publication Data
US 2017/0130979 A1   May 11, 2017

(51) Int. Cl.
| | |
|---|---|
| *F24F 11/00* | (2018.01) |
| *H04W 4/02* | (2018.01) |
| *H04W 4/021* | (2018.01) |
| *H04W 4/029* | (2018.01) |
| *F24F 11/30* | (2018.01) |
| *F24F 11/62* | (2018.01) |
| *F24F 120/10* | (2018.01) |
| *F24F 120/12* | (2018.01) |
| *F24F 11/64* | (2018.01) |
| *F24F 11/56* | (2018.01) |
| *F24F 11/61* | (2018.01) |

(52) U.S. Cl.
CPC ............ *H04W 4/021* (2013.01); *F24F 11/30* (2018.01); *F24F 11/62* (2018.01); *H04W 4/029* (2018.02); *F24F 11/56* (2018.01); *F24F 11/61* (2018.01); *F24F 11/64* (2018.01); *F24F 2120/10* (2018.01); *F24F 2120/12* (2018.01); *G05B 2219/2614* (2013.01)

(58) Field of Classification Search
CPC ................. F24F 11/0034; F24F 11/006; F24F 2011/0035; F24F 2011/0063; F24F 2011/0068; F24F 2011/0073; G05B 2219/2614; H04W 4/021
See application file for complete search history.

(56) References Cited

U.S. PATENT DOCUMENTS

| | | |
|---|---|---|
| 5,317,670 A | 5/1994 | Elia |
| 6,255,988 B1 | 7/2001 | Bischoff |
| (Continued) | | |

FOREIGN PATENT DOCUMENTS

| | | |
|---|---|---|
| AU | 2015201441 A1 | 10/2015 |
| CN | 101689327 | 5/2013 |
| (Continued) | | |

OTHER PUBLICATIONS

Balaji et al., "Sentinel: Occupancy Based HVAC Actuation Using Existing WiFi Infrastructure Within Commercial Buildings," SenSys '13, 14 pages, Nov. 11-15, 2015.
(Continued)

*Primary Examiner* — Kenneth M Lo
*Assistant Examiner* — Mohammad A Rahman
(74) *Attorney, Agent, or Firm* — Shumaker & Sieffert, P.A.

(57) ABSTRACT

An HVAC control system, wherein a building temperature is controlled to a comfort temperature set point when users are inside the geofence and is allowed to deviate from the comfort temperature set point when all users are outside of the geofence. The amount that the building temperature is allowed to deviate from the comfort temperature set point may be in accordance with how long the users have remained outside of the geofence.

18 Claims, 10 Drawing Sheets

(56) References Cited

U.S. PATENT DOCUMENTS

| | | |
|---|---|---|
| 6,356,282 B2 | 3/2002 | Roytman et al. |
| 6,400,956 B1 | 6/2002 | Richton |
| 6,478,233 B1 | 11/2002 | Shah |
| 6,529,137 B1 | 3/2003 | Roe |
| 6,604,023 B1 | 8/2003 | Brown et al. |
| 6,665,613 B2 | 12/2003 | Duvall |
| 6,909,891 B2 | 6/2005 | Yamashita et al. |
| 6,990,335 B1 | 1/2006 | Shamoon et al. |
| 7,083,109 B2 | 8/2006 | Pouchak |
| 7,127,734 B1 | 10/2006 | Amit |
| 7,130,719 B2 | 10/2006 | Ehlers et al. |
| 7,155,305 B2 | 12/2006 | Hayes et al. |
| D535,573 S | 1/2007 | Barton et al. |
| 7,159,789 B2 | 1/2007 | Schwendinger et al. |
| 7,257,397 B2 | 8/2007 | Shamoon et al. |
| 7,327,250 B2 | 2/2008 | Harvey |
| 7,343,226 B2 | 3/2008 | Ehlers et al. |
| 7,385,500 B2 | 6/2008 | Irwin |
| D580,801 S | 11/2008 | Takach et al. |
| 7,451,017 B2 | 11/2008 | McNally |
| 7,510,126 B2 | 3/2009 | Rossi et al. |
| 7,571,865 B2 | 8/2009 | Nicodem et al. |
| 7,574,208 B2 | 8/2009 | Hanson et al. |
| 7,614,567 B2 | 11/2009 | Chapman et al. |
| 7,636,604 B2 | 12/2009 | Bergman et al. |
| 7,668,532 B2 | 2/2010 | Shamoon et al. |
| 7,768,393 B2 | 8/2010 | Nigam |
| 7,801,646 B2 | 9/2010 | Amundson et al. |
| 7,812,274 B2 | 10/2010 | Dupont et al. |
| 7,839,275 B2 | 11/2010 | Spalink et al. |
| 7,904,608 B2 | 3/2011 | Price |
| 7,908,211 B1 | 3/2011 | Chen et al. |
| 7,949,615 B2 | 5/2011 | Ehlers et al. |
| 7,953,518 B2 | 5/2011 | Kansal et al. |
| 7,973,678 B2 | 7/2011 | Petricoin, Jr. et al. |
| 8,018,329 B2 | 9/2011 | Morgan et al. |
| 8,026,261 B2 | 9/2011 | Tam et al. |
| 8,064,935 B2 | 11/2011 | Shamoon et al. |
| 8,065,342 B1 | 11/2011 | Borg et al. |
| 8,095,340 B2 | 1/2012 | Brown |
| 8,115,656 B2 | 2/2012 | Bevacqua et al. |
| 8,125,332 B2 | 2/2012 | Curran et al. |
| 8,126,685 B2 | 2/2012 | Nasle |
| 8,131,401 B2 | 3/2012 | Nasle |
| 8,135,413 B2 | 3/2012 | Dupray |
| 8,140,279 B2 | 3/2012 | Subbloie |
| 8,150,421 B2 | 4/2012 | Ward et al. |
| 8,180,492 B2 | 5/2012 | Steinberg |
| 8,195,313 B1 | 6/2012 | Fadell et al. |
| 8,205,244 B2 | 6/2012 | Nightingale et al. |
| 8,219,114 B2 | 7/2012 | Larsen |
| 8,229,722 B2 | 7/2012 | Tran et al. |
| 8,229,772 B2 | 7/2012 | Tran et al. |
| 8,232,877 B2 | 7/2012 | Husain |
| 8,255,090 B2 | 8/2012 | Frader-Thompson et al. |
| 8,269,620 B2 | 9/2012 | Bullemer et al. |
| 8,280,536 B1 | 10/2012 | Fadell et al. |
| 8,280,559 B2 | 10/2012 | Herman et al. |
| 8,301,765 B2 | 10/2012 | Goodman |
| 8,305,935 B2 | 11/2012 | Wang |
| 8,315,717 B2 | 11/2012 | Forbes, Jr. et al. |
| 8,323,081 B2 | 12/2012 | Koizumi et al. |
| 8,332,055 B2 | 12/2012 | Veillette |
| 8,334,906 B2 | 12/2012 | Lipton et al. |
| 8,350,697 B2 | 1/2013 | Trundle et al. |
| 8,386,082 B2 | 2/2013 | Oswald |
| 8,390,473 B2 | 3/2013 | Kryzanowski et al. |
| 8,406,162 B2 | 3/2013 | Haupt et al. |
| 8,412,381 B2 | 4/2013 | Nikovski et al. |
| 8,412,654 B2 | 4/2013 | Montalvo |
| 8,428,867 B2 | 4/2013 | Ashley, Jr. et al. |
| 8,433,344 B1 | 4/2013 | Virga |
| 8,442,695 B2 | 5/2013 | Imes et al. |
| 8,457,797 B2 | 6/2013 | Imes et al. |
| 8,509,954 B2 | 8/2013 | Imes et al. |
| 8,510,241 B2 | 8/2013 | Seshan |
| 8,510,255 B2 | 8/2013 | Fadell et al. |
| 8,510,421 B2 | 8/2013 | Matsuzaki et al. |
| 8,531,294 B2 | 9/2013 | Slavin et al. |
| 8,554,374 B2 | 10/2013 | Lunacek et al. |
| 8,554,714 B2 | 10/2013 | Raymond et al. |
| 8,556,188 B2 | 10/2013 | Steinberg |
| 8,560,127 B2 | 10/2013 | Leen et al. |
| 8,571,518 B2 | 10/2013 | Imes et al. |
| 8,577,392 B1 | 11/2013 | Pai et al. |
| 8,587,445 B2 | 11/2013 | Rockwell |
| 8,606,374 B2 | 12/2013 | Fadell et al. |
| 8,620,393 B2 * | 12/2013 | Bornstein .............. G01S 19/48 455/574 |
| 8,620,841 B1 | 12/2013 | Filson et al. |
| 8,626,344 B2 | 1/2014 | Imes et al. |
| 8,630,741 B1 | 1/2014 | Matsuoka et al. |
| 8,634,796 B2 | 1/2014 | Johnson |
| 8,648,706 B2 | 2/2014 | Ranjun et al. |
| 8,666,558 B2 | 3/2014 | Wang |
| 8,670,783 B2 | 3/2014 | Klein |
| 8,686,841 B2 | 4/2014 | Macheca et al. |
| 8,718,826 B2 | 5/2014 | Ramachandran et al. |
| 8,725,831 B2 | 5/2014 | Barbeau et al. |
| 8,798,804 B2 | 8/2014 | Besore et al. |
| 8,810,454 B2 | 8/2014 | Cosman |
| 8,812,024 B2 | 8/2014 | Obermeyer et al. |
| 8,812,027 B2 | 8/2014 | Obermeyer et al. |
| 8,840,033 B2 | 9/2014 | Steinberg |
| 8,868,254 B2 | 10/2014 | Louboutin |
| 8,874,129 B2 | 10/2014 | Forutanpour et al. |
| 8,886,178 B2 | 11/2014 | Chatterjee |
| 8,890,675 B2 | 11/2014 | Ranjan et al. |
| 8,909,256 B2 | 12/2014 | Fraccaroli |
| 8,918,219 B2 | 12/2014 | Sloo et al. |
| 8,941,489 B2 | 1/2015 | Sheshadri et al. |
| 8,965,401 B2 | 2/2015 | Sheshadri et al. |
| 8,965,406 B2 | 2/2015 | Henderson |
| 9,026,261 B2 | 5/2015 | Bukhin et al. |
| 9,033,255 B2 | 5/2015 | Tessier et al. |
| 9,055,475 B2 | 6/2015 | Lacatus et al. |
| 9,071,453 B2 | 6/2015 | Shoemaker et al. |
| 9,113,298 B2 | 8/2015 | Qiu |
| 9,167,381 B2 | 10/2015 | McDonald et al. |
| 9,168,927 B2 | 10/2015 | Louboutin |
| 9,183,530 B2 | 11/2015 | Schwarz et al. |
| 9,210,125 B1 | 12/2015 | Nichols |
| 9,210,545 B2 | 12/2015 | Sabatelli et al. |
| 9,215,560 B1 | 12/2015 | Jernigan |
| 9,219,983 B2 | 12/2015 | Sheshadri et al. |
| 9,247,378 B2 | 1/2016 | Bisson et al. |
| 9,280,559 B1 | 3/2016 | Jones |
| 9,288,620 B2 | 3/2016 | Menendez |
| 9,292,022 B2 | 3/2016 | Ramachandran et al. |
| 9,363,638 B1 | 3/2016 | Jones |
| 9,307,344 B2 | 4/2016 | Rucker et al. |
| 9,311,685 B2 | 4/2016 | Harkey et al. |
| 9,313,320 B2 | 4/2016 | Zeilingold et al. |
| 9,363,636 B2 | 6/2016 | Zeilingold et al. |
| 9,363,772 B2 | 6/2016 | Burks |
| 9,396,344 B1 | 7/2016 | Jones |
| 9,414,422 B2 | 8/2016 | Belghoul et al. |
| 9,432,807 B2 | 8/2016 | Kern, Jr. et al. |
| 9,433,681 B2 | 9/2016 | Constien et al. |
| 9,449,491 B2 | 9/2016 | Sager et al. |
| 9,477,239 B2 | 10/2016 | Begman et al. |
| 9,491,577 B1 | 11/2016 | Jones |
| 9,495,866 B2 | 11/2016 | Roth et al. |
| 9,521,519 B2 | 12/2016 | Chiou et al. |
| 9,552,002 B2 | 1/2017 | Sloo et al. |
| 9,560,482 B1 | 1/2017 | Frenz |
| 9,589,435 B2 | 3/2017 | Finlow-Bates |
| 9,594,384 B2 | 3/2017 | Bergman et al. |
| 9,609,478 B2 | 3/2017 | Frenz et al. |
| 9,618,227 B2 | 4/2017 | Drew |
| 9,628,951 B1 | 4/2017 | Kolavennu et al. |
| 9,635,500 B1 | 4/2017 | Becker et al. |
| 9,645,589 B2 | 5/2017 | Leen et al. |
| 9,674,658 B2 * | 6/2017 | Partheesh .............. H04W 4/021 |

(56) References Cited

U.S. PATENT DOCUMENTS

| | | | |
|---|---|---|---|
| 9,900,174 B2 | 2/2018 | Gamberini | |
| 9,979,763 B2 | 5/2018 | Nichols | |
| 2002/0147006 A1 | 10/2002 | Coon et al. | |
| 2004/0034484 A1 | 2/2004 | Solomita et al. | |
| 2005/0172056 A1 | 8/2005 | Ahn | |
| 2006/0063522 A1 | 3/2006 | McFarland | |
| 2006/0097063 A1 | 5/2006 | Zeevi | |
| 2007/0037605 A1 | 2/2007 | Logan | |
| 2007/0043478 A1 | 2/2007 | Ehlers et al. | |
| 2007/0060171 A1 | 3/2007 | Sudit et al. | |
| 2007/0099626 A1 | 5/2007 | Lawrence et al. | |
| 2007/0114295 A1 | 5/2007 | Jenkins | |
| 2007/0249319 A1 | 10/2007 | Faulkner et al. | |
| 2008/0094230 A1 | 4/2008 | Mock et al. | |
| 2008/0143550 A1* | 6/2008 | Ebrom | G06F 9/54 340/12.29 |
| 2008/0262820 A1 | 10/2008 | Nasle | |
| 2009/0012704 A1 | 1/2009 | Franco et al. | |
| 2009/0187499 A1 | 7/2009 | Mulder et al. | |
| 2009/0240381 A1 | 9/2009 | Lane | |
| 2009/0302994 A1 | 12/2009 | Rhee | |
| 2010/0034386 A1 | 2/2010 | Choong et al. | |
| 2010/0042940 A1 | 2/2010 | Monday et al. | |
| 2010/0081375 A1 | 4/2010 | Rosenblatt et al. | |
| 2010/0127854 A1 | 5/2010 | Helvick et al. | |
| 2010/0156628 A1 | 6/2010 | Ainsbury et al. | |
| 2010/0261465 A1 | 10/2010 | Rhoads et al. | |
| 2011/0148634 A1 | 6/2011 | Putz | |
| 2011/0153525 A1 | 6/2011 | Benco et al. | |
| 2011/0214060 A1 | 9/2011 | Imes et al. | |
| 2011/0314144 A1 | 12/2011 | Goodman | |
| 2012/0065802 A1 | 3/2012 | Seeber | |
| 2012/0172027 A1* | 7/2012 | Partheesh | H04W 4/021 455/420 |
| 2012/0185101 A1* | 7/2012 | Leen | G05D 19/02 700/728 |
| 2012/0191257 A1 | 7/2012 | Corcoran et al. | |
| 2012/0209730 A1 | 8/2012 | Garrett | |
| 2012/0259466 A1 | 10/2012 | Ray et al. | |
| 2012/0284769 A1 | 11/2012 | Dixon et al. | |
| 2013/0073094 A1 | 3/2013 | Knapton et al. | |
| 2013/0204441 A1 | 8/2013 | Sloo et al. | |
| 2013/0225196 A1 | 8/2013 | James et al. | |
| 2013/0226352 A1* | 8/2013 | Dean-Hendricks | F24F 11/0009 700/276 |
| 2013/0231137 A1 | 9/2013 | Hugie et al. | |
| 2013/0267253 A1* | 10/2013 | Case | H04W 4/021 455/456.3 |
| 2013/0310053 A1 | 11/2013 | Srivastava et al. | |
| 2013/0318217 A1 | 11/2013 | Imes et al. | |
| 2013/0331087 A1* | 12/2013 | Shoemaker | H04L 67/125 455/420 |
| 2013/0331128 A1 | 12/2013 | Qiu | |
| 2014/0031989 A1 | 1/2014 | Bergman et al. | |
| 2014/0031991 A1 | 1/2014 | Bergman et al. | |
| 2014/0045482 A1 | 2/2014 | Bisson et al. | |
| 2014/0100835 A1 | 4/2014 | Majumdar et al. | |
| 2014/0156087 A1 | 6/2014 | Amundson | |
| 2014/0164118 A1 | 6/2014 | Polachi | |
| 2014/0172176 A1 | 6/2014 | Deilmann et al. | |
| 2014/0200718 A1 | 7/2014 | Tessier | |
| 2014/0244048 A1 | 8/2014 | Ramachandran et al. | |
| 2014/0248910 A1 | 9/2014 | Dave et al. | |
| 2014/0266635 A1 | 9/2014 | Roth et al. | |
| 2014/0277762 A1 | 9/2014 | Drew | |
| 2014/0302879 A1 | 10/2014 | Kim et al. | |
| 2014/0313032 A1 | 10/2014 | Sager | |
| 2014/0330435 A1 | 11/2014 | Stoner et al. | |
| 2014/0337123 A1 | 11/2014 | Neurenberg et al. | |
| 2014/0349672 A1 | 11/2014 | Kern et al. | |
| 2014/0370911 A1 | 12/2014 | Gorgenyi et al. | |
| 2015/0065161 A1 | 3/2015 | Ganesh et al. | |
| 2015/0094860 A1 | 4/2015 | Finnerty et al. | |
| 2015/0140994 A1* | 5/2015 | Partheesh | H04W 4/021 455/420 |
| 2015/0141045 A1 | 5/2015 | Qiu et al. | |
| 2015/0159895 A1 | 6/2015 | Quam et al. | |
| 2015/0163631 A1 | 6/2015 | Quam et al. | |
| 2015/0163945 A1 | 6/2015 | Barton et al. | |
| 2015/0167999 A1 | 6/2015 | Seem et al. | |
| 2015/0180713 A1 | 6/2015 | Stewart et al. | |
| 2015/0181382 A1 | 6/2015 | McDonald | |
| 2015/0186497 A1 | 7/2015 | Patton et al. | |
| 2015/0228419 A1* | 8/2015 | Fadell | G08B 17/00 307/112 |
| 2015/0237470 A1 | 8/2015 | Mayor et al. | |
| 2015/0271638 A1 | 9/2015 | Menayas et al. | |
| 2015/0285527 A1 | 10/2015 | Kim et al. | |
| 2015/0301543 A1 | 10/2015 | Janoso et al. | |
| 2015/0309484 A1* | 10/2015 | Lyman | G05B 13/0205 700/275 |
| 2015/0338116 A1 | 11/2015 | Furuta et al. | |
| 2015/0370272 A1 | 12/2015 | Reddy et al. | |
| 2015/0372832 A1 | 12/2015 | Kortz et al. | |
| 2016/0007156 A1 | 1/2016 | Chiou et al. | |
| 2016/0018122 A1 | 1/2016 | Frank et al. | |
| 2016/0018800 A1 | 1/2016 | Gettings | |
| 2016/0018832 A1* | 1/2016 | Frank | H04W 4/021 700/276 |
| 2016/0054865 A1 | 2/2016 | Kerr et al. | |
| 2016/0057572 A1 | 2/2016 | Bojorquez et al. | |
| 2016/0142872 A1 | 5/2016 | Nicholson et al. | |
| 2016/0189496 A1* | 6/2016 | Modi | G08B 13/08 340/545.2 |
| 2016/0223998 A1* | 8/2016 | Songkakul | G05B 15/02 |
| 2016/0261424 A1 | 9/2016 | Gamberini | |
| 2016/0286033 A1 | 9/2016 | Frenz | |
| 2016/0313749 A1 | 10/2016 | Frenz | |
| 2016/0313750 A1 | 10/2016 | Frenz et al. | |
| 2017/0026506 A1 | 1/2017 | Haepp et al. | |
| 2017/0130979 A1 | 5/2017 | Kolavennu et al. | |
| 2017/0134214 A1 | 5/2017 | Sethuraman et al. | |
| 2017/0139580 A1 | 5/2017 | Kimura et al. | |
| 2017/0171704 A1 | 6/2017 | Frenz | |
| 2017/0181100 A1 | 6/2017 | Kolavennu et al. | |
| 2017/0241660 A1 | 8/2017 | Sekar et al. | |
| 2018/0241789 A1 | 8/2018 | Nichols | |

FOREIGN PATENT DOCUMENTS

| | | |
|---|---|---|
| CN | 103175287 A | 6/2013 |
| CN | 104704863 A | 6/2015 |
| CN | 105318499 A | 2/2016 |
| DE | 102013226390 A1 | 6/2015 |
| EP | 1515289 | 3/2005 |
| EP | 2607802 A2 | 6/2013 |
| EP | 2675195 A2 | 12/2013 |
| EP | 3001116 A1 | 3/2016 |
| JP | 2011203841 A | 10/2011 |
| JP | 2012109680 A | 6/2012 |
| MX | 2012000906 | 9/2012 |
| WO | 2006055334 A1 | 5/2006 |
| WO | 2009034720 | 3/2009 |
| WO | 2009036764 A2 | 3/2009 |
| WO | WO 2009/034720 | 3/2009 |
| WO | WO 2009/036764 | 3/2009 |
| WO | 2009067251 A1 | 5/2009 |
| WO | WO 2009/067251 | 5/2009 |
| WO | 2011011404 A1 | 1/2011 |
| WO | WO 2011/011404 | 1/2011 |
| WO | 2011121299 A1 | 10/2011 |
| WO | WO 2011/121299 | 10/2011 |
| WO | 2012000107 A1 | 1/2012 |
| WO | WO 2012/000107 | 1/2012 |
| WO | 2012068517 A1 | 5/2012 |
| WO | WO 2012/068517 | 5/2012 |
| WO | 2013170791 A1 | 11/2013 |
| WO | WO 2013/170791 | 11/2013 |
| WO | 2014016705 A2 | 1/2014 |
| WO | WO 2014/016705 | 1/2014 |
| WO | 2014047501 A1 | 3/2014 |

(56) References Cited

FOREIGN PATENT DOCUMENTS

| WO | WO 2014/047501 | 3/2014 |
| WO | 2014055939 A1 | 4/2014 |
| WO | 2014144323 A1 | 9/2014 |
| WO | WO 2014/144323 | 9/2014 |
| WO | 2014197320 A1 | 12/2014 |
| WO | 2014200524 A2 | 12/2014 |
| WO | WO 2014/197320 | 12/2014 |
| WO | 2015047739 A1 | 4/2015 |
| WO | 2015089116 A1 | 6/2015 |
| WO | 2015164400 A1 | 10/2015 |

OTHER PUBLICATIONS

"Petition for Inter Partes Review of U.S. Pat. No. 8,571,518 Pursuant to 35 U.S.C. 311-319, 37 CFR 42," Inventor Imes et al., dated Oct. 29, 2014.
Do, "Programmable Communicating Thermostats for Demand Response in California," DR ETD Workshop, 26 pages, Jun. 11, 2007.
Green, "PM's Thermostat Guide," Popular Mechanics, pp. 155-158, Oct. 1985.
Gupta et al., "Adding GPS-Control to Traditional Thermostats: An Exploration of Potential Energy Savings and Design Challenges," Pervasive, LNCS 5538, pp. 95-114, 2009.
Gupta, "A Persuasive GPS-Controlled Thermostat System," 89 pages, Sep. 2008.
http://community.lockitron.com/notifications-geofencing-scheduling-sense-bluetooth/633, "Lockitron Community, Notifications, Geofencing, Scheduling, Sense/Bluetooth," 14 pages, printed Oct. 29, 2014.
http://IWww.prnev.tswire.com/nev.ts-releases/allure-energy-unveils-a-combination-of-ibeacon-and-nfc-enabled-smart-sensor-technology-known-as-aura-23885 . . . , "Allure Energy Unveils a Combination of iBeacon and NFC Enabled Smart Sensor Technology Known as Aura," 6 pages, Jan. 6, 2014.
Mobile Integrated Solutions, LLC, "MobiLinc Take Control of Your Home, MobiLinc and Geo-Fence Awareness," 9 pages, downloaded Mar. 27, 2015.
Pan et al., "A Framework for Smart Location-Based Automated Energy Controls in a Green Building Testbed," 6 pages, downloaded Jan. 30, 2015.
SmartThings Inc., "2 Ecobee Si Thermostat + Geofencing," 17 pages, downloaded Nov. 3, 2014.
Allure Energy, "Our Technology," http://www.allure-energy.com/pages/about.jsp 1 page, printed May 30, 2012.
International Search Report for PCT Application No. PCT/US2010/042589 dated Nov. 22, 2010.
U.S. Appl. No. 14/640,984, filed Mar. 6, 2015.
U.S. Appl. No. 14/668,800, filed Mar. 25, 2015.
U.S. Appl. No. 14/696,662, filed Apr. 27, 2015.
U.S. Appl. No. 14/696,725, filed Apr. 27, 2015.
U.S. Appl. No. 14/933,948, filed Nov. 5, 2015.
U.S. Appl. No. 14/934,543, filed Nov. 6, 2015.
U.S. Appl. No. 14/938,595, filed Nov. 11, 2015.
U.S. Appl. No. 14/938,642, filed Nov. 11, 2015.
U.S. Appl. No. 14/964,264, filed Dec. 9, 2015.
U.S. Appl. No. 14/964,349, filed Dec. 9, 2015.
Mozer, "The Neural Network House: An Environment that Adapts to its Inhabitants," Department of Computer Science University of Colorado, 5 pages, Downloaded May 29, 2012.
The Extended European Search Report and Opinion for EP Application No. 16156760.7-1862, dated Jul. 8, 2016.
The Extended European Search Report for EP Application No. 1619416, dated Feb. 2, 2017.
The Extended European Search Report for EP Application No. 16196128.9, dated Mar. 7, 2017.
Gentec, "Feature Focus, Threat Level Management," 2 pages, 2013.
The Extended European Search Report for EP Application No. 16195639.6, dated May 31, 2017.
Scanlon et al., "Mutual Information Based Visual Feature Selection for Lipreading," 8th International Conference on Spoken Language Processing, 5 pages, Oct. 4-8, 2004.
Transportation Research Board of the National Academies, "Commuting in America III, the Third National Report on Commuting Patterns and Trends," 199 pages, 2006.
U.S. Appl. No. 15/048,902, filed Feb. 19, 2016.
The International Search Report for PCT Application No. PCT/US2010/042589 dated Nov. 22, 2010.
http://community.lockitron.com/notifications-geofencing-scheduling-sense-bluetooth/633, "Lockitron Community, Notifications, Geofencing, Scheduling, Sense/Bluetooth," 6 pages, printed Oct. 29, 2014.
http://stackoverflow.com/questions/14232712/tracking-multiple-20-locations-with-ios-geofencing, "Tracking Multiple (20+) Locations with iOS Geofencing—Stack Overflow," 2 pages, printed Oct. 29, 2014.
http://www.allure-energy.com/aenf_jan9_12.html, "CES Gets First Look at EverSense," Allure Energy, 2 pages, printed Feb. 17, 2015.
http://www.pmev.tswire.com/nev.ts-releases/allure-energy-unveils-a-combination-of-ibeacon-and-nfc-enabled-smart-sensor-technology-known-as-aura-23885 . . . , "Allure Energy Unveils a Combination of iBeacon and NFC Enabled Smart Sensor Technology Known as Aura," 6 pages, Jan. 6, 2014.
Response to Extended Search Report dated May 31, 2017, from counterpart European Application No. 16195639.6, filed Nov. 22, 2017, 21 pp.
Text Intended to Grant from counterpart European Application No. 16195639.6, dated Mar. 20, 2018, 66 pp.

* cited by examiner

HVAC CONTROL USING GEOFENCING

TECHNICAL FIELD

The disclosure relates generally to building automation and more particularly to building automation systems with geo-fencing capabilities.

BACKGROUND

Building automation systems are often used to control safety, security and/or comfort levels within a building or other structure. Illustrative but non-limiting examples of building automation systems include Heating, Ventilation and/or Air Conditioning (HVAC) systems, security systems, lighting systems, fire suppression systems and/or the like. In some cases, a building automation system may enter an unoccupied mode when the building is expected to be unoccupied and an occupied mode when the building is expected to be occupied. For example, when the building automation system includes an HVAC system, the building automation system may set a temperature set point of the HVAC system to a more energy efficient setting when in an unoccupied mode and a more comfortable setting when in an occupied mode. In another example, when the building automation system includes a security system, the building automation system may set the security system to a locked or away state when in an unoccupied mode and an unlocked or home state when in an occupied mode.

Geofencing may be utilized to inform the building automation system as to when the building is expected to be occupied and unoccupied. There is a desire to have better information as to when the building will be occupied or unoccupied in order to optimize energy savings while meeting desired comfort requirements.

SUMMARY

The present disclosure pertains generally to geofencing, and more particularly to building automation systems with geofencing capabilities. An example of the disclosure may be found in a method of controlling an HVAC system for a building, the HVAC system implementing geofencing using a geofence that is defined for the building. A building temperature may be controlled to a comfort temperature set point when the user is inside the geofence and may be allowed to deviate from the comfort temperature set point when the user is outside of the geofence. In some cases, the building temperature may be allowed to deviate from the comfort temperature set point in accordance with how long the user has remained outside of the geofence.

Another example of the disclosure may be found in an HVAC control system for controlling operation of HVAC equipment within a building, the HVAC control system configured to be in operative communication with a user's mobile device providing geofence functionality. The HVAC control system may include an input for receiving location information indicating where the user's mobile device is in relation to a geofence defined for the building and a memory for storing the location information received from the user's mobile device. A controller may be operatively coupled to the input and to the memory and may be configured to control the HVAC equipment and maintain a comfort temperature within the building when the user's mobile device is located within the geofence. The controller may allow a building temperature in the building to deviate from the comfort temperature when the user's mobile device is located outside the geofence. The controller may determine how far the building temperature is allowed to deviate from the comfort temperature based at least in part on how far outside of the geofence the user's mobile device is located and how long the user's mobile device has remained outside of the geofence.

Another example of the disclosure may be found in a building automation server for servicing a user's building. The building automation server may include an input for receiving a geofence status of one or more mobile devices that are associated with the user's building, wherein the geofence status includes whether the one or more mobile devices are inside a geofence or outside a geofence defined for the user's building. The building automation server may include an output for outputting a command to a building controller in the user's building. A controller may be operably coupled to the input and the output and may be configured to keep track of the geofence status for each of the one or more mobile devices. The controller may output a command via the output to change a set point of the building controller to an energy saving set point upon detecting that all of the one or more mobile devices are outside of the geofence and to output a command via the output to change a set point of the user's building to a comfort temperature set point upon detecting that at least one of the one or more mobile devices are inside the geofence. The controller may further be configured to determine how much to change the set point based at least in part on how long one or more of the mobile devices have been outside the geofence.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which.

Figure 1:
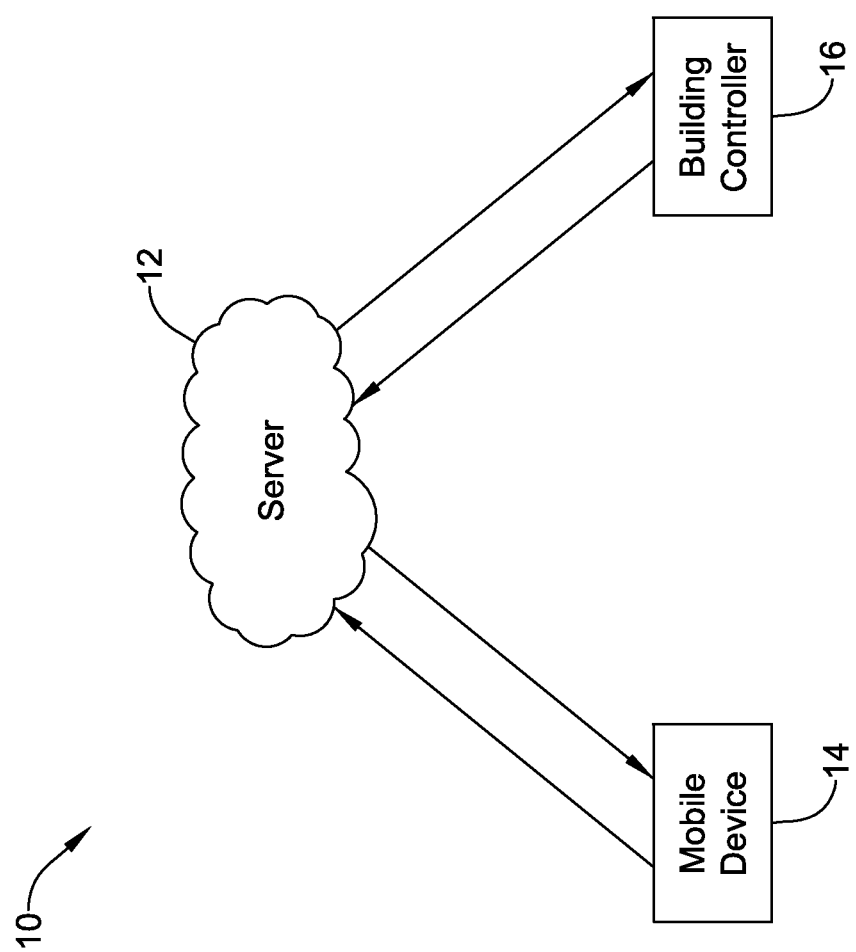
FIG. 1 is a schematic view of an illustrative building automation system.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

The present disclosure is directed generally at building automation systems. Building automation systems are systems that control one or more operations of a building. Building automation systems can include HVAC systems, security systems, fire suppression systems, energy management systems and/or any other suitable systems. While HVAC systems are used as an example below, it should be recognized that the concepts disclosed herein can be applied to building control systems more generally.

A building automation system may include a controller, computer and/or other processing equipment that is configured to control one or more features, functions, systems or sub-systems of a building. In some cases, devices can be used by individuals to communicate with the controller, computer and/or other processing equipment. In some cases, a building automation system may include a plurality of components that, in combination, perform or otherwise provide the functionality of the building automation system. A building automation system may be fully contained within a single building, or may include components that are spread between multiple housings and/or across multiple locations. In some embodiments, a building automation system, regardless of the physical location(s) of the components within the building automation system, may control one or more building systems within a single building. In some cases, a building automation system, regardless of the physical location(s) of the components within the building automation system, may control one or more building systems within a plurality of buildings, optionally in accordance with a common operating procedure and/or distinct operating procedures for each building as desired.

FIG. 1 is a schematic view of an illustrative building automation system 10. The illustrative building automation system 10 includes a server 12 that may be configured to communicate with a mobile device 14 and with a building controller 16. It will be appreciated that for simplicity, only a single mobile device 14 is shown, while in many cases the server 12 may be configured to communicate directly or indirectly with any number of mobile devices 14. Similarly, while a single building controller 16 is illustrated, in many cases the server 12 may be configured to communicate directly or indirectly with any number of building controllers 16, located in a single building or distributed throughout a plurality of buildings. The server 12 is illustrated as a single, cloud-based server. In some cases, the server 12 may be a single server. In some instances, the server 12 may generically represent two, three or more servers commonly located or spread between two or more physical locations. In some cases, the server 12 handles communication with both the mobile device 14 and the building controller 16. In some instances, as shown for example in FIG. 2, distinct servers may carry out each communications protocol if desired.

In some cases, the mobile devices 14 may communicate with the server 12 at least partially through a network such as the Internet, sometimes using a cell phone network, WiFi network and/or any other suitable network. Likewise, it is contemplated that the building controller 16 may communicate with the server 12 at least partially through a network such as the Internet, sometimes using a cell phone network, WiFi network and/or any other suitable network.

The server 12 is illustrated in FIG. 1 as being discrete from the building controller 16. In some cases, at least some functionality of the server 12 may be provided within the building controller 16. In some cases, the server 12 may be manifested within the building controller 16. In some cases, at least some functionality of the server 12 may be provided within the mobile device 14. In some cases, at least some of the functionality of the server 12 may be provided within the building controller 16 and at least some of the functionality of the server 12 may be provided within the mobile device 14.

Figure 2:
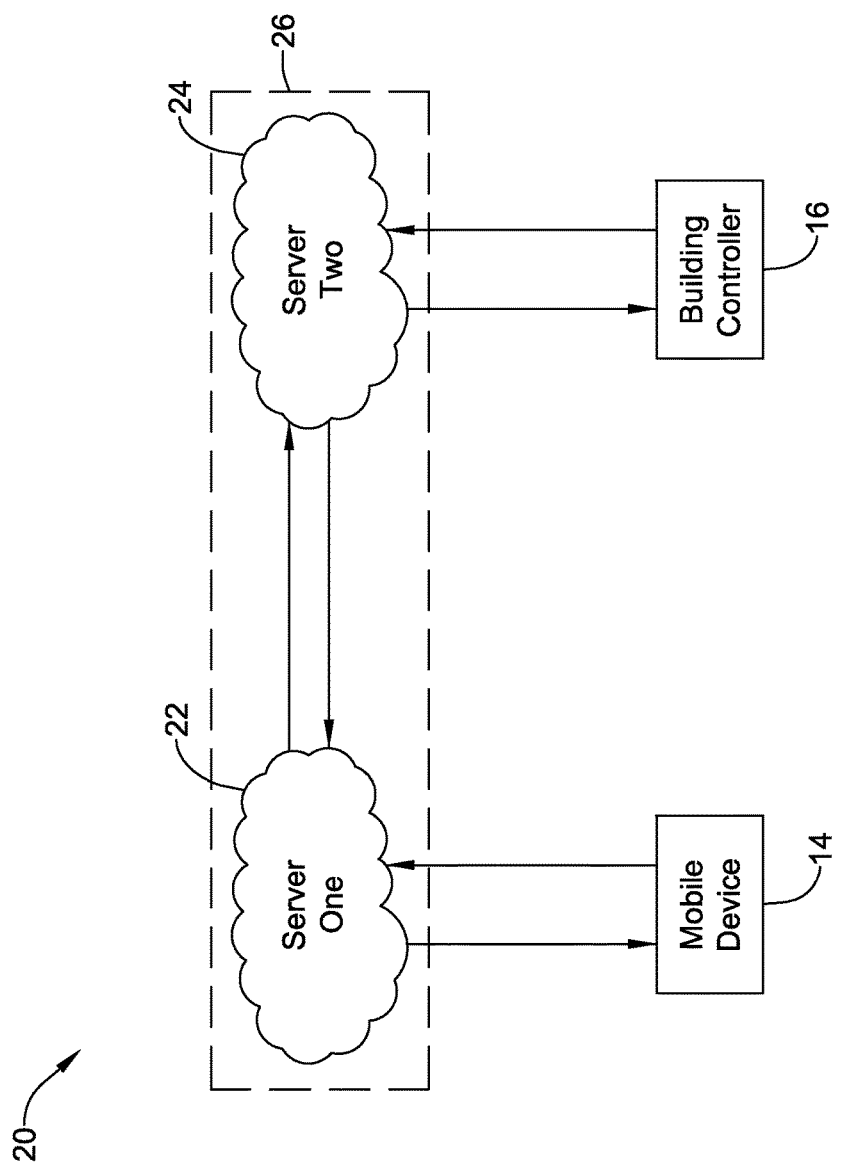
FIG. 2 is a schematic view of another illustrative building automation system.

FIG. 2 is a schematic illustration of another illustrative building automation system 20. The illustrative building automation system 20 includes a first server 22 that may be configured to communicate with a mobile device 14 (or multiple mobile devices 14) and a second server 24 that may be configured to communicate with a building controller 16 (or multiple building controllers 16). The first server 22 may be configured to receive data from the mobile device 14, process the data, and send data to the mobile device 14 and/or to the second server 24. The second server 24 may be configured to send data and/or commands to the building controller 16. In some cases, the second server 24 may be configured to receive data from the building controller 16, process the data, and send data to the building controller 16 and/or to the first server 22. In some instances, the first server 22 may be configured to permit data from the mobile device 14 to pass directly through to the building controller 16. In some cases, the second server 24 may be configured to permit data from the building controller 16 to pass directly through to the mobile device 14. The first server 22 and the second server 24 may be configured to communicate with each other. In some cases, each of the first server 22 and the second server 24 may perform a defined function.

It will be appreciated that for simplicity, only a single mobile device 14 is shown, while in many cases the first server 22 may be configured to communicate directly or indirectly with any number of mobile devices 14. Similarly, while a single building controller 16 is illustrated, in many cases the second server 24 may be configured to communicate directly or indirectly with any number of building controllers 16, located in a single building or distributed throughout a plurality of buildings.

The first server 22 is illustrated as a single, cloud-based server. In some cases, the first server 22 may be a single server. In some instances, the first server 22 may generically represent two, three or more servers commonly located or spread between two or more physical locations. The second server 24 is illustrated as a single, cloud-based server. In some cases, the second server 24 may be a single server. In some instances, the second server 24 may generically represent two, three or more servers commonly located or spread between two or more physical locations. In some cases, the first server 22 and the second server 24 may, in combination, be considered as representing or forming a building automation server 26.

Figure 3:
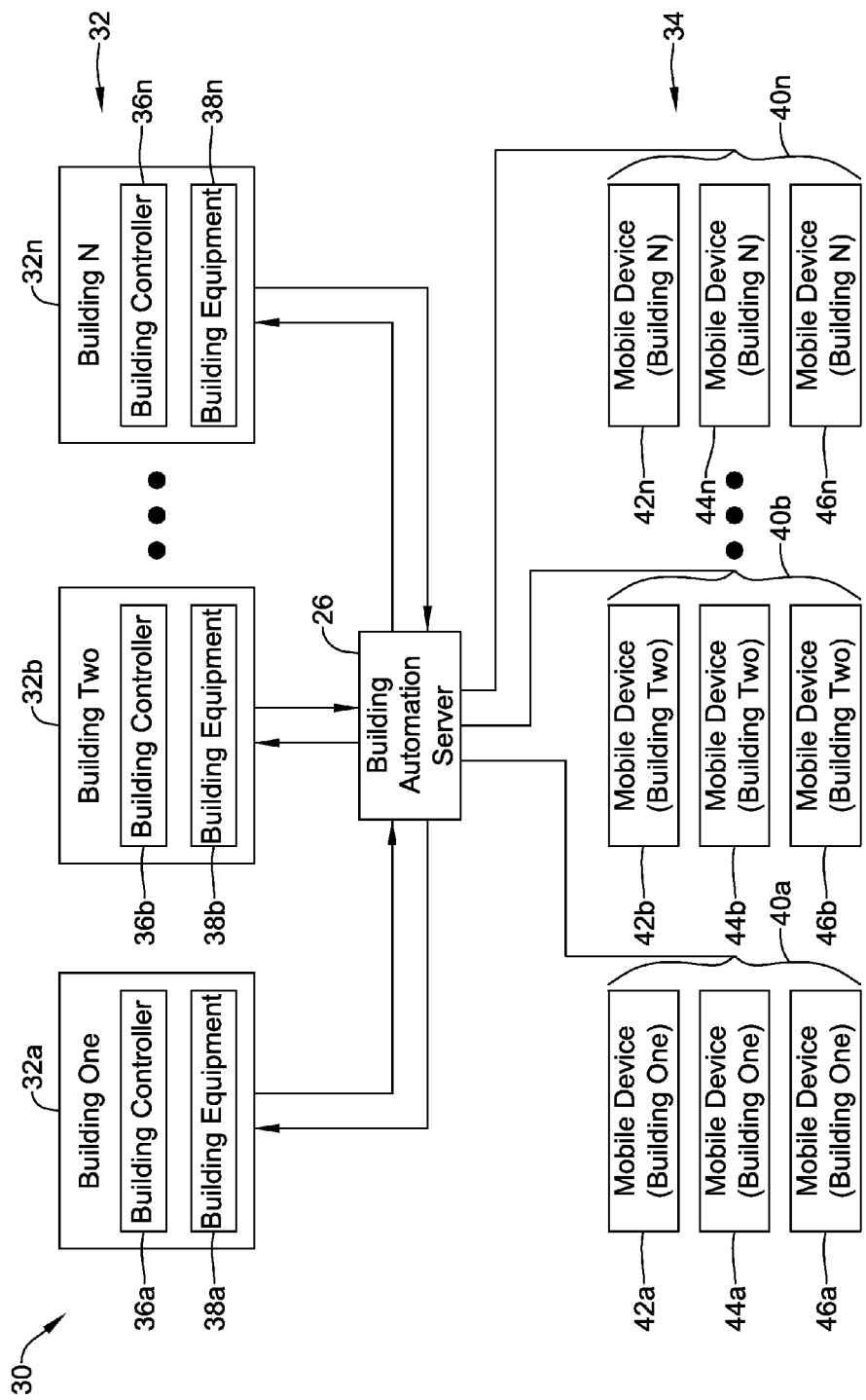
FIG. 3 is a schematic view of another illustrative building automation system.

FIG. 3 is a schematic illustration of a building automation system 30 in which a building automation server 26 is configured to communicate with a plurality of buildings 32 as well as a plurality of mobile devices 34. It is contemplated that the building automation server 26 may include a single server or two or more distinct servers at one or several locations. The building automation system 30 may serve any desired number of buildings. As illustrated, the plurality of buildings 32 includes a Building One, labeled as 32A, a Building Two, labeled as 32B, and so on through a Building "N", labeled as 32N. It will be appreciated that the building automation system 30 may include a large number of buildings, each in communication with a central (or distributed) building automation server 26. In some cases, each building may be associated with a unique customer account, as further described below.

As illustrated, each of the plurality of buildings 32 includes a building controller and one or more pieces of building equipment. The building equipment may, for example, be HVAC equipment, security equipment, lighting equipment, fire suppression equipment, and/or the like. In particular, the building 32A includes a building controller 36A and building equipment 38A, the building 32B includes a building controller 36B and building equipment 38B, and so on through the building 32N, which includes a building controller 36N and building equipment 38N. It will be appreciated that while each building is illustrated as having a single building controller and single building equipment controlled by the single building controller, in some cases a building may have multiple related or unrelated building controllers and/or multiple pieces of related or unrelated building equipment.

The plurality of mobile devices 34 may be considered as being divided into a set of mobile devices each associated with a corresponding building. In the example shown, the plurality of mobile devices 34 may be considered as being divided into a set of mobile devices 40A that are associated with the building 32A, a set of mobile devices 40B that are associated with the building 32B, and so on through a set of mobile devices 40N that are associated with the building 32N. As illustrated, the set of mobile devices 40A includes a first mobile device 42A, a second mobile device 44A and a third mobile device 46A. The set of mobile devices 40B includes a first mobile device 42B, a second mobile device 44B and a third mobile device 46B and so on through the set of mobile devices 40N, which includes a first mobile device 42N, a second mobile device 44N and a third mobile device 46N. This is merely illustrative, as any number of mobile devices such as smartphones or tablets, may be associated with a particular building, as desired. Each user or occupant of a building may have an associated mobile device, or may have several associated mobile devices. In some cases, a user or occupant may have a mobile device associated with several different locations such as a home, a cabin or a place of work.

Associating a mobile device with a particular building generally involves the individual who uses the particular mobile device. In the example shown in FIG. 3, a mobile device can communicate with the building automation server 26, and may cause the building automation server 26 to provide instructions to the building controller that is associated with the particular mobile device. For example, and in some instances, a mobile phone with location services activated can be used to inform the building automation server 26 as to the whereabouts of the user of the mobile phone relative to a geo-fence defined for the associated building, and in some cases an estimate of how long before the user will likely arrive at the associated building. The building automation server 26 may send a command to the building controller of the associated building to operate the building equipment in an energy savings manner when all of the users that are associated with a particular building are determined to be away from the building (e.g. the building is unoccupied). The building automation server 26 may send a command to the building controller of the associated building to operate the building equipment in a comfort mode when all of the users that are associated with a particular building are determined or deemed not to be away from the building (e.g. the building is occupied).

Figure 4:
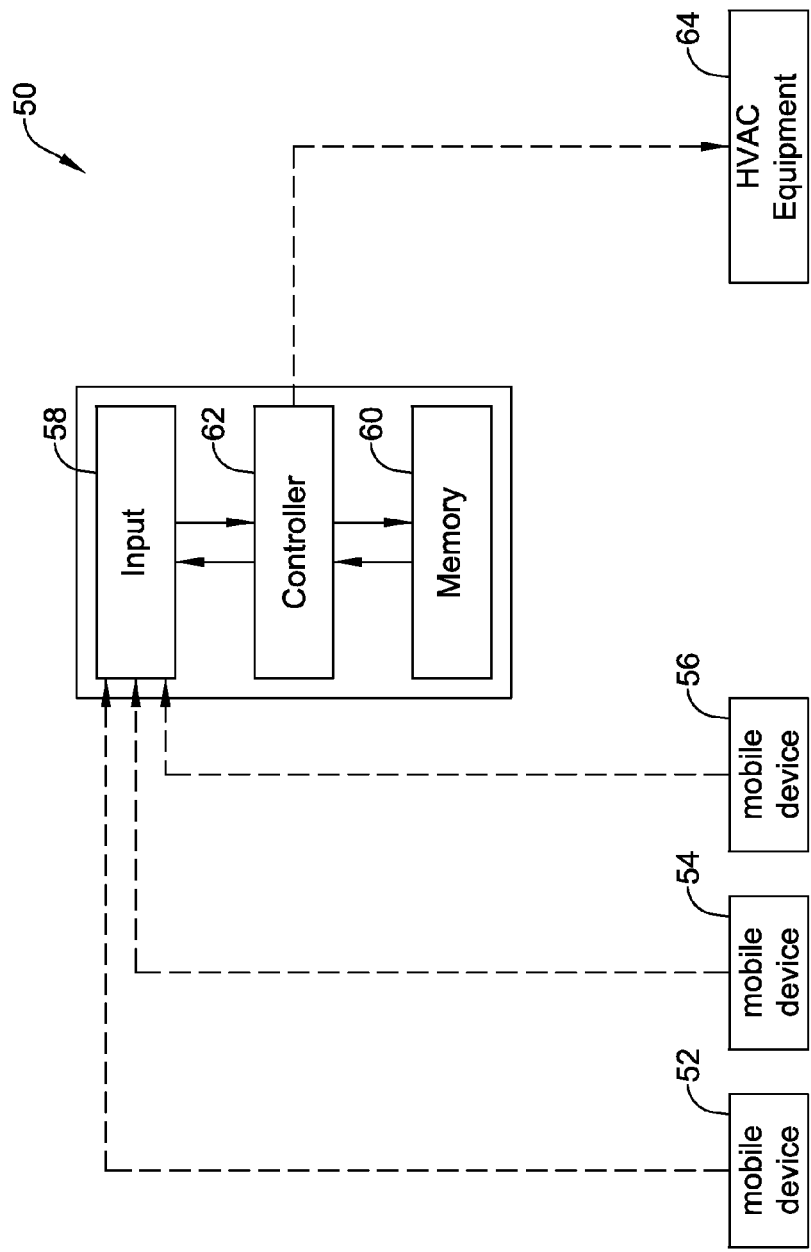
FIG. 4 is a schematic view of an illustrative HVAC control system.

FIG. 4 is a schematic illustration of an illustrative HVAC control system 50 for controlling HVAC equipment within a building. In some instances, the HVAC control system 50 may be considered as being an example of the building controller 16 (FIGS. 1 and 2). In some cases, the illustrative HVAC control system 50 may be or include an HVAC controller that is located in the building. In some cases, the HVAC control system 50 may instead be a cloud-based server that is located outside of the building and is connected to and issues commands to a local building controller within the building.

In some cases, the illustrative HVAC control system 50 may be in operative communication with a user's mobile device 52. In some instances, the HVAC control system 50 may be in operative communication with several mobile devices, such as mobile device 52, mobile device 54 and mobile device 56. While a total of three mobile devices are illustrated, it will be appreciated that the HVAC control system 50 may be in operative communication with any number of mobile devices. It will be appreciated that the mobile devices 52, 54, 56 may provide geofence functionality. The HVAC control system 50 may include an input 58 that can receive location information directly or indirectly from the mobile devices 52, 54, 56 that indicates where the particular mobile device, such as the mobile device 52, is in relation to a geofence that is defined for an associated building. In some cases, the input 58 may receive location information indicating where each of a plurality of mobile devices, such as the mobile devices 52, 54, 56, are in relation to the geofence. A memory 60 can store the location information that was received from the user's mobile device 52. In some cases, the memory 60 may store the location information that was received from each of the plurality of mobile devices 52, 54, 56. A controller 62 may be operatively coupled to the input 58 and to the memory 60.

In some cases, the controller 62 is configured to control HVAC equipment 64 in order to maintain a comfort temperature within the building when the user's mobile device 52 is located within the geofence as this indicates that the user is either home or close to home. In some instances, the controller 62 may control the HVAC equipment 64 in order to maintain a comfort temperature within the building when one or more of the mobile devices 52, 54, 56 are within the geofence. The controller 62 may be configured to allow a building temperature in the building to deviate from the comfort temperature when the user's mobile device 52 is located outside the geofence. In some cases, the controller 62 may be configured to allow a building temperature to deviate from the comfort temperature when all of the mobile devices 52, 54, 56 are outside of the geofence.

In some cases, the controller 62 may determine how far the building temperature is allowed to deviate from the comfort temperature towards a more energy efficient temperature based at least in part on: how long the user's mobile device 52 has remained outside of the geofence, and in some cases, how far outside of the geofence the user's mobile device 52 is located. In some cases, the controller 62 determines how far the building temperature is allowed to deviate from the comfort temperature based at least in part on: how long the plurality of user's mobile devices 52, 54, 56 have all remained outside of the geofence, and in some cases, how far the closest of the plurality of user's mobile devices 52, 54, 56 is outside of the geofence.

It will be appreciated that how far the controller 62 permits the building temperature to deviate from the comfort temperature towards a more energy efficient temperature may be based at least in part on how quickly the HVAC equipment 64 can drive the building temperature back to the comfort temperature. In some cases, the controller 62 may allow the building temperature to deviate from the comfort temperature to an extent that the HVAC equipment 64 cannot return the building temperature back to the comfort temperature by the time the closest user's mobile device 52 can return to the building. In some instances, the user may be asked for their input as to how aggressively the controller 62 will attempt to conserve energy at the possible expense of some user comfort. In some instances, the controller 62 may store, in the memory 60, data pertaining to how long the user remains outside the geofence for each of a plurality of days, use the stored data to provide an estimate as to when the user is expected to return to the geofence and use the estimate to adjust how far the building temperature is allowed to deviate from the comfort temperature.

Figure 5:
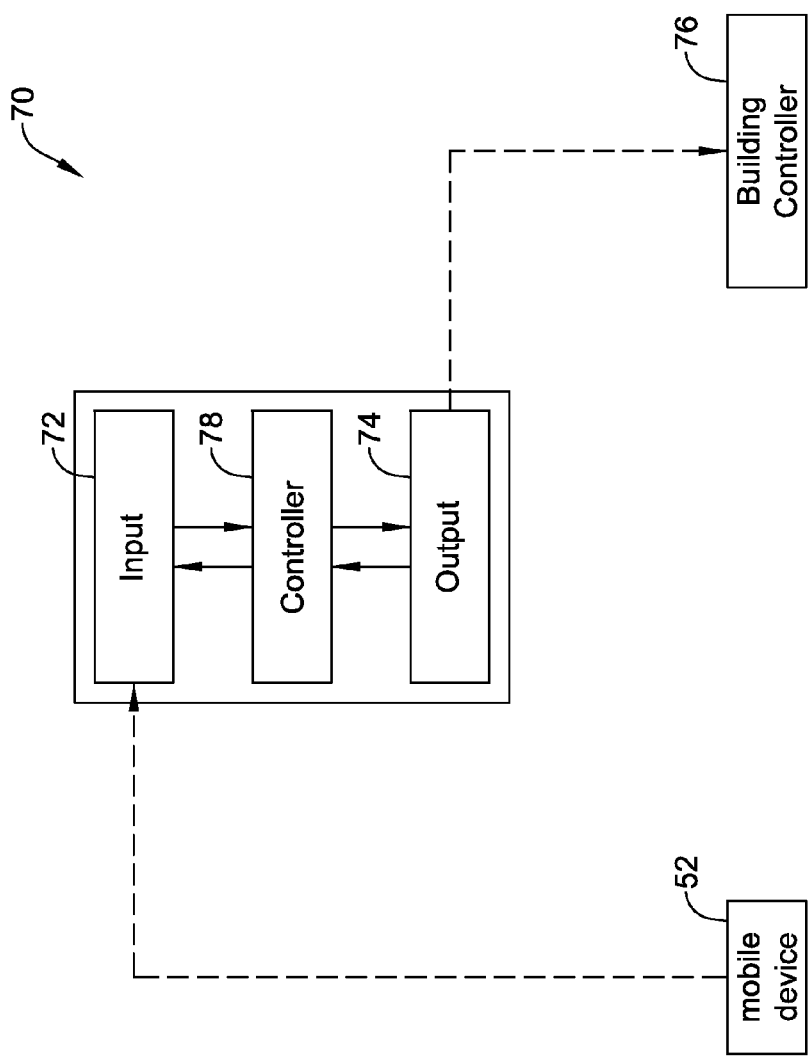
FIG. 5 is a schematic view of an illustrative building automation server.

FIG. 5 is a schematic illustration of a building automation server 70 for servicing a user's building. The building automation server 70 includes an input 72 for receiving a geofence status of one or more mobile devices 52 that are associated with the user's building. The geofence status may include, for example, whether the one or more mobile devices 52 are inside a geofence or outside a geofence defined for the user's building. In some cases, the geofence status may also include how far a corresponding mobile device 52 is from the geofence (or building), and in some cases, speed, route and/or direction of the corresponding mobile device 52. While a single mobile device 52 is illustrated, it will be appreciated that the input 72 may be configured to receive geofence status information from any number of mobile devices. An output 74 may be configured to output commands to a building controller 76 that is located within the user's building. In some cases, the building controller 76 may specifically be an HVAC controller, and the output 74 may be configured to output commands to the HVAC controller to the HVAC controller, including but not limited to an energy savings temperature set point or an offset from a comfort temperature set point.

A controller 78 may be operably coupled to the input 72 and the output 74 and may be configured to keep track of the geofence status for each of the one or more mobile devices 52. In some cases, the controller 78 may be configured to output a command via the output 74 to change a set point of the building controller 76 to an energy saving set point upon detecting that all of the one or more mobile devices 52 are outside of the geofence. The controller 78 may also be configured to output a command via the output 74 to change a set point of the user's building to a comfort temperature set point upon detecting that at least one of the one or more mobile devices 52 are inside the geofence or are expected to cross into the geofence.

In some instances, the controller 78 is configured to change a temperature set point to an energy savings temperature set point that is based on a relationship in which the temperature set point is changed "X" degrees for each multiple of a set distance between the closest mobile device of the one or more mobile devices 52 and the geofence (or building). For example, the controller 78 may change the temperature set point by one degree Fahrenheit for each 1000 meters the closest mobile device 52 is outside of the geofence. In some cases, the controller 78 may allow the building temperature to further deviate by "X" more additional degrees Fahrenheit for each hour (or other predetermined time period) that the one or more mobile devices 52 remains outside of the geofence, or perhaps for each hour that the one or more mobile devices 52 remains at a roughly constant distance from the geofence and/or that the one or more mobile devices 52 remains stationary or substantially stationary outside of the geofence. In some instances, the controller 78 may not change the temperature set point by "X" degrees for each multiple of a set distance as described above, but may allow the building temperature to deviate by "X" degrees Fahrenheit from the comfort temperature for each hour (or other predetermined time period) that the one or more mobile devices 52 remains outside of the geofence, or perhaps for each hour that the one or more mobile devices 52 remains at a roughly constant distance from the geofence and/or that the one or more mobile devices 52 remains stationary or substantially stationary outside of the geofence. These examples are merely illustrative.

In some cases, the controller 78 may be configured to receive information, via the input 72, pertaining to an adaptive intelligent recovery (AIR) ramp rate from the local building controller 76. The controller 78 may limit how far the temperature set point can vary from the comfort temperature set point in accordance with the AIR ramp rate in combination with an estimated shortest time that any of the one or more of the mobile devices 52 could return to the building, and also on how long one or more of the mobile devices 52 have remained outside the geofence.

In some cases, the AIR ramp rate may be an approximation of how quickly the HVAC equipment can heat or cool the building (e.g. degrees/hour). It will be appreciated that the AIR ramp rate may be impacted by weather conditions. For example, on a cold cloudy windy day, the building may not heat as quickly as it may on a day in which the outdoor air temperature may be just as cold, but when the winds are calm and the sky is sunny. In another example, the building may not heat as quickly for a given outside temperature during the nighttime hours relative to the daytime hours because at night little or no solar energy is absorbed by the building.

In some cases, the controller 78 may implement a particular AIR ramp rate, and may track how quickly the building temperature actually recovers. If the building temperature regains the comfort temperature set point more quickly than anticipated, the next time the controller 78 may delay the start of the heating ramp. Conversely, if the building temperature does not recover as quickly as predicted by the AIR ramp rate, the next time the controller 78 may start the heating ramp a little earlier. The predicted AIR ramp rate may depend on the outside conditions, the inside conditions, the time of day and/or any other suitable parameters.

Figure 6:
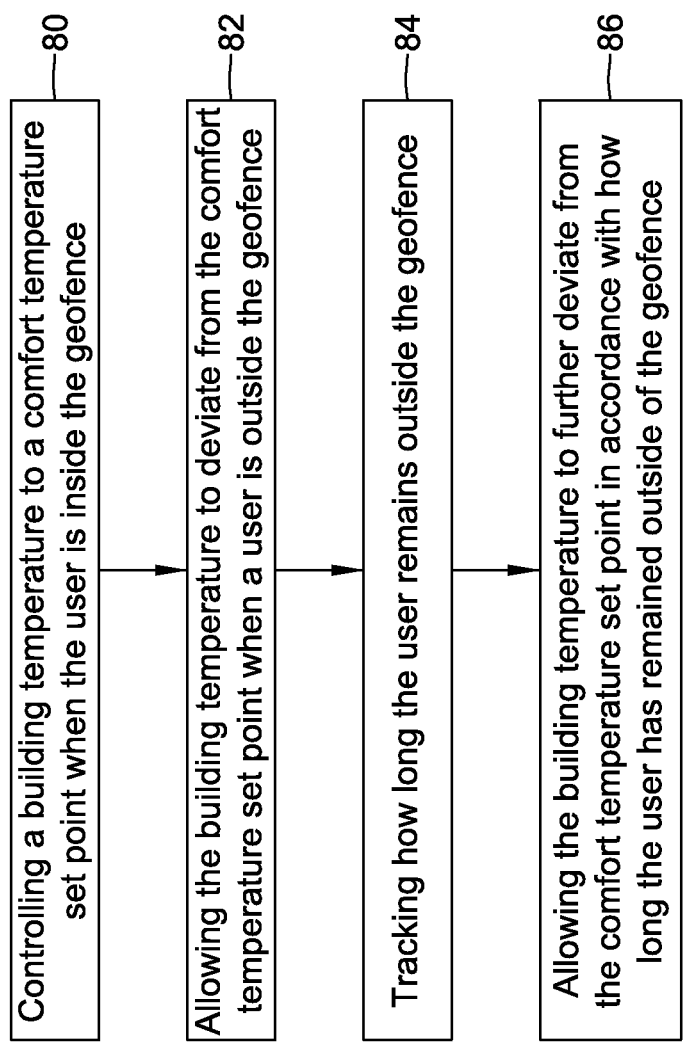
FIGS. 6 through 10 are flow diagrams showing illustrative methods that may be carried out in accordance with embodiments of the disclosure.

FIG. 6 is a flow diagram showing an illustrative method for controlling an HVAC system that implements geofencing. A building temperature is controlled to a comfort temperature set point when the user is inside the geofence, as indicated at block 80. When the user travels outside of the geofence, the building temperature is allowed to deviate from the comfort temperature set point as indicated at block 82. In some cases, the building temperature is allowed to deviate from the comfort temperature set point by an amount that is based at least in part on a distance between the geofence and the user.

How long the user remains outside the geofence may be tracked, as seen at block 84. At block 86, the building temperature is allowed to further deviate from the comfort temperature set point in accordance with how long the user has remained outside of the geofence. In some cases, allowing the building temperature to further deviate from the comfort temperature set point in accordance with how long the user has remained outside of the geofence includes allowing the building temperature to deviate from the comfort temperature set point to an extent that the HVAC system cannot return to the comfort temperature set point if the user were to return directly to the building. In some instances, the building temperature does not deviate from the comfort temperature set point by an amount that is based at least in part on a distance between the geofence and the user, but does deviate from the comfort temperature set point in accordance with how long the user has remained outside of the geofence.

Figure 7:
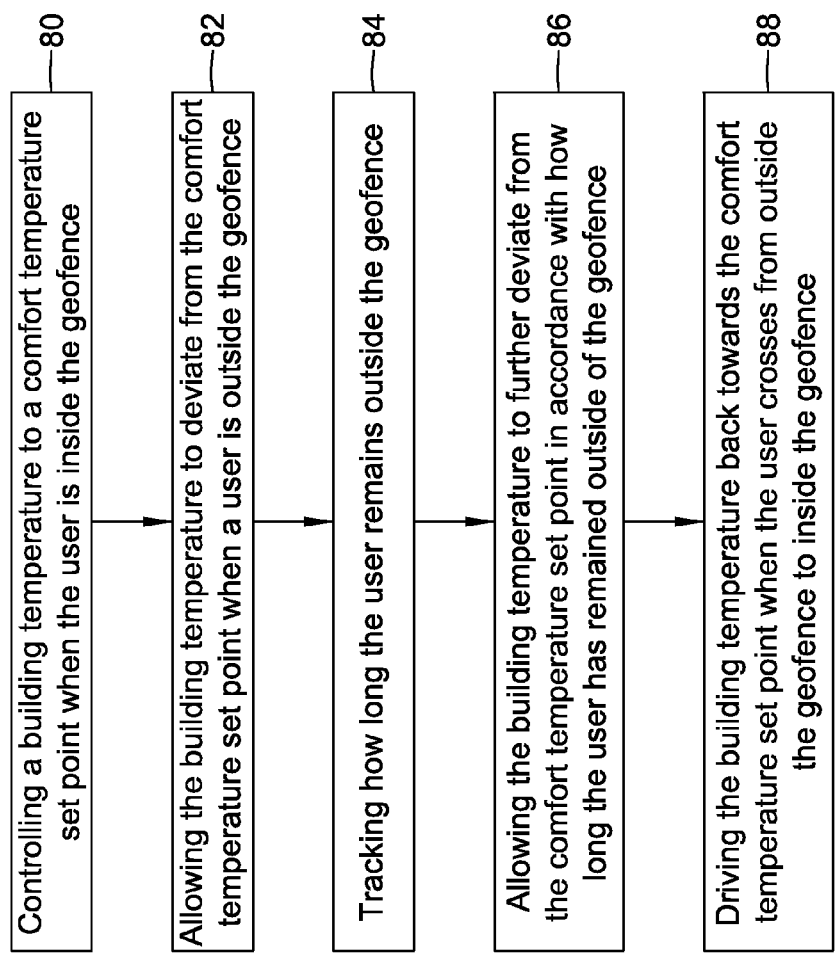

FIG. 7 is a flow diagram showing another illustrative method for controlling an HVAC system that implements geofencing. A building temperature is controlled to a comfort temperature set point when the user is inside the geofence, as indicated at block 80. When the user travels outside of the geofence, the building temperature is allowed to deviate from the comfort temperature set point as indicated at block 82. In some cases, the building temperature is allowed to deviate from the comfort temperature set point by an amount that is based at least in part on a distance between the geofence and the user, but this is not required.

How long the user remains outside the geofence may be tracked, as seen at block 84. At block 86, the building temperature is allowed to further deviate from the comfort temperature set point in accordance with how long the user has remained outside of the geofence. In some cases, allowing the building temperature to further deviate from the comfort temperature set point in accordance with how long the user has remained outside of the geofence includes allowing the building temperature to deviate from the comfort temperature set point to an extent that the HVAC system cannot return to the comfort temperature set point if the user were to return directly to the building. In some instances, the building temperature does not deviate from the comfort temperature set point by an amount that is based at least in part on a distance between the geofence and the user, but does deviate from the comfort temperature set point in accordance with how long the user has remained outside of the geofence.

In some cases, as seen at block 88, the building temperature is driven back towards the comfort temperature set point when, for example: (1) the user crosses from outside the geofence to inside the geofence; (2) does not remain a roughly constant distance from the geofence; and/or (3) does not remain stationary or substantially stationary outside of the geofence.

Figure 8:
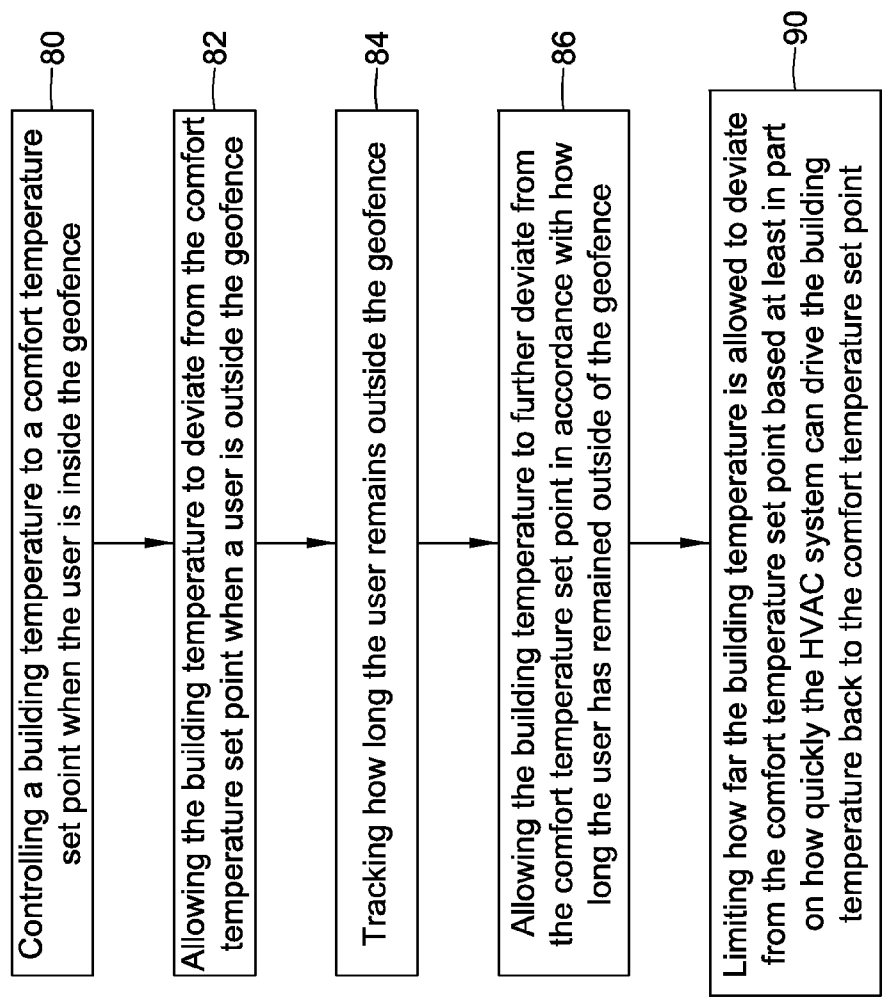

FIG. 8 is a flow diagram showing an illustrative method of controlling an HVAC system that implements geofencing. A building temperature is controlled to a comfort temperature set point when the user is inside the geofence, as indicated at block 80. When the user is outside of the geofence, the building temperature is allowed to deviate from the comfort temperature set point as indicated at block 82. In some cases, the building temperature is allowed to deviate from the comfort temperature set point by an amount that is based at least in part on a distance between the geofence and the user, but this is not required.

How long the user remains outside the geofence may be tracked, as seen at block 84. At block 86, the building temperature is allowed to further deviate from the comfort temperature set point in accordance with how long the user has remained outside of the geofence. In some cases, allowing the building temperature to further deviate from the comfort temperature set point in accordance with how long the user has remained outside of the geofence includes allowing the building temperature to deviate from the comfort temperature set point to an extent that the HVAC system cannot return to the comfort temperature set point if the user were to return directly to the building. In some cases, as seen at block 90, how far the building temperature is allowed to deviate from the comfort temperature set point may be based at least in part on how quickly the HVAC system can drive the building temperature back to the comfort temperature set point. In some instances, the building temperature does not deviate from the comfort temperature set point by an amount that is based at least in part on a distance between the geofence and the user, but does deviate from the comfort temperature set point in accordance with how long the user has remained outside of the geofence.

Figure 9:
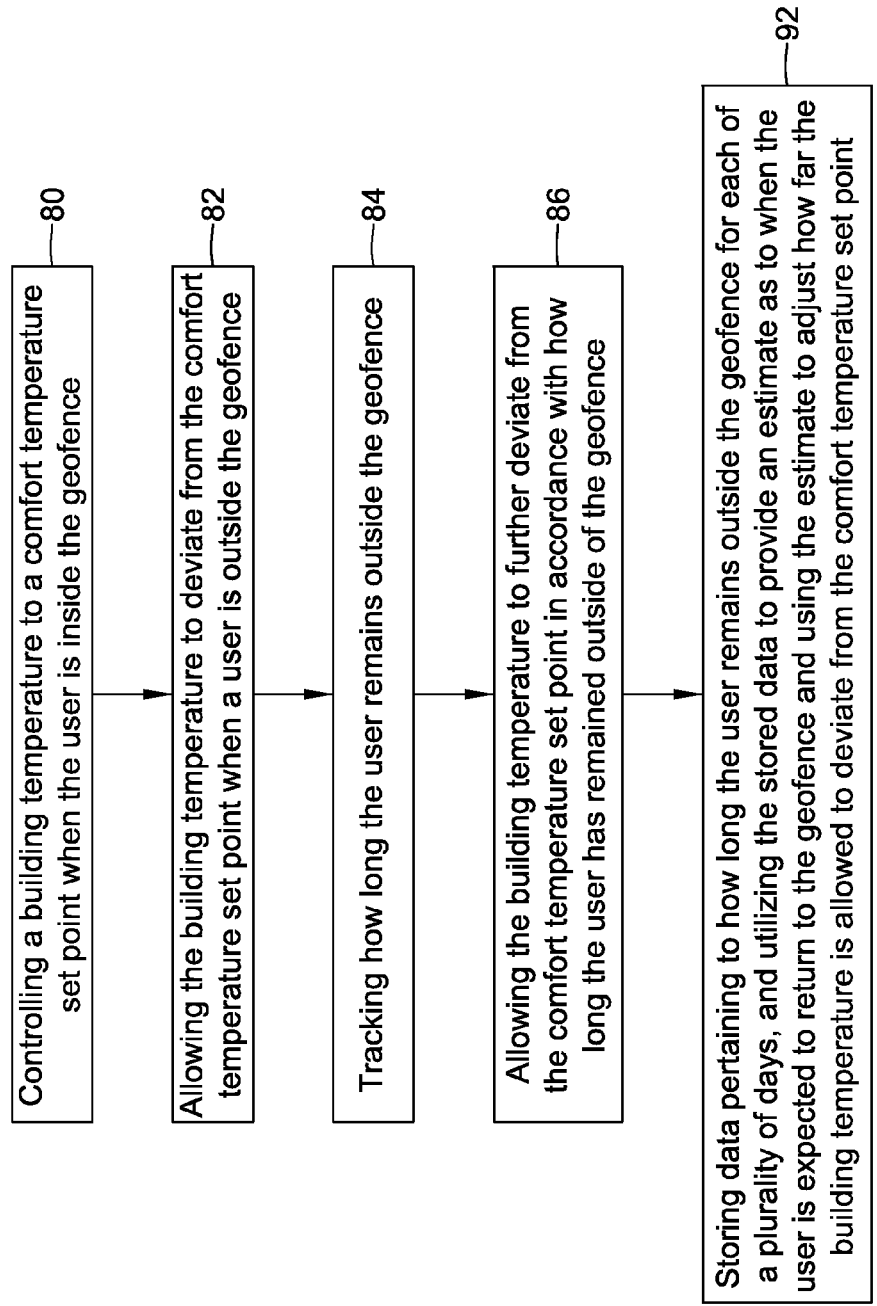

FIG. 9 is a flow diagram showing another illustrative method of controlling an HVAC system that implements geofencing. A building temperature is controlled to a comfort temperature set point when the user is inside the geofence, as indicated at block 80. When the user is outside of the geofence, the building temperature is allowed to deviate from the comfort temperature set point as indicated at block 82. In some cases, the building temperature is allowed to deviate from the comfort temperature set point by an amount that is based at least in part on a distance between the geofence and the user, but this is not required.

How long the user remains outside the geofence may be tracked, as seen at block 84. At block 86, the building temperature is allowed to further deviate from the comfort temperature set point in accordance with how long the user has remained outside of the geofence. In some cases, allowing the building temperature to further deviate from the comfort temperature set point in accordance with how long the user has remained outside of the geofence includes allowing the building temperature to deviate from the comfort temperature set point to an extent that the HVAC system cannot return to the comfort temperature set point if the user were to return directly to the building. In some cases, as indicated at block 92, data pertaining to how long the user remains outside the geofence is stored for each of a plurality of days, the stored data is then utilized to provide an estimate as to when the user is expected to return to the geofence. This estimate of when the user is expected to return to the geofence may be used to adjust how far the building temperature is allowed to further deviate from the comfort temperature set point. In some instances, the building temperature does not deviate from the comfort temperature set point by an amount that is based at least in part on a distance between the geofence and the user, but does deviate from the comfort temperature set point in accordance with how long the user has remained outside of the geofence.

Figure 10:
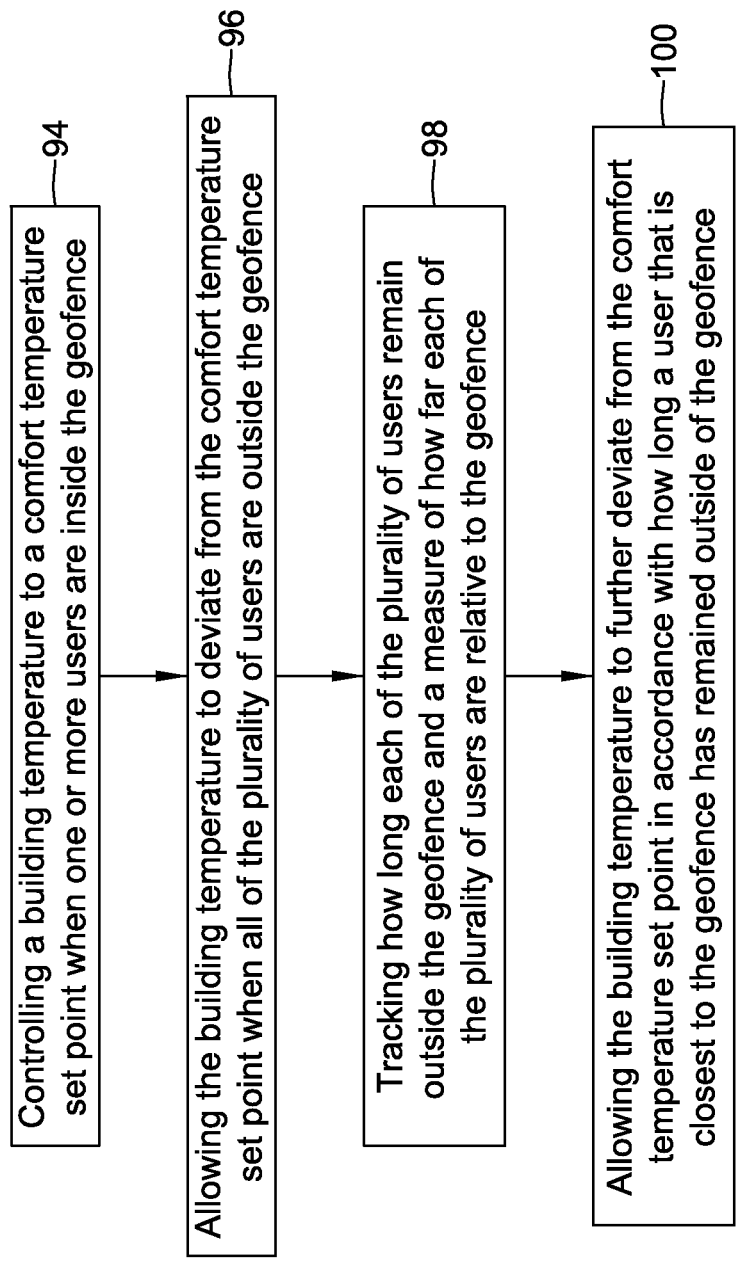

FIG. 10 is a flow diagram showing another illustrative method of controlling an HVAC system that implements geofencing. A building temperature is controlled to a comfort temperature set point when one or more users are inside the geofence, as indicated at block 94. When all of the users are outside of the geofence, the building temperature is allowed to deviate from the comfort temperature set point as indicated at block 96. In some cases, the building temperature is allowed to deviate from the comfort temperature set point by an amount that is based at least in part on a distance between the geofence and the closest user, but this is not required. How long each of the plurality of users remains outside the geofence may be tracked, as seen at block 98. At block 100, the building temperature is allowed to further deviate from the comfort temperature set point in accordance with how long the closest user has remained outside of the geofence. In some instances, the building temperature does not deviate from the comfort temperature set point by an amount that is based at least in part on a distance between the geofence and the user, but does deviate from the comfort temperature set point in accordance with how long the user has remained outside of the geofence.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A method of controlling an HVAC system for a building, the HVAC system implementing geofencing using a geofence that is defined for the building or a user of the building, the method comprising:
controlling a building temperature to a comfort temperature set point when the user is inside the geofence;
allowing the building temperature to deviate from the comfort temperature set point by a first amount when the user crosses from inside the geofence to outside of the geofence;
tracking how long the user remains outside the geofence; and
determining a second amount specifying how far the building temperature is allowed to further deviate beyond the first amount based on how long the user remains outside the geofence irrespective of a distance between the geofence and the user, wherein determining the second amount comprises increasing the second amount by a predetermined amount for each predetermined time period that the user remains outside of the geofence; and
allowing the building temperature to further deviate beyond the first amount by the second amount while the user remains outside of the geofence.

2. The method of claim 1, further comprising driving the building temperature back towards the comfort temperature set point when the user crosses from outside the geofence to inside the geofence.

3. The method of claim 1, wherein the first amount is based at least in part on a distance between the geofence and the user.

4. The method of claim 1, further comprising limiting the first amount based at least in part on how quickly the HVAC system can drive the building temperature back to the comfort temperature set point.

5. The method of claim 1, wherein the first amount and the second amount collectively can result in a deviation where the HVAC system cannot return to the comfort temperature set point by the time the user returns to the building.

6. The method of claim 1, further comprising storing data pertaining to how long the user remains outside the geofence for each of a plurality of days, and utilizing the stored data to provide an estimate as to when the user is expected to return to the geofence and using the estimate to adjust the second amount.

7. An HVAC control system for controlling operation of HVAC equipment within a building, the HVAC control system configured to be in operative communication with a mobile device providing geofence functionality, the HVAC control system comprising:
an input for receiving location information indicating where the mobile device is in relation to a geofence defined for the building;
a memory for storing the location information received from the mobile device;
a controller operatively coupled to the input and to the memory, the controller configured to control the HVAC equipment to maintain a comfort temperature within the building when the mobile device is located within the geofence;
the controller further configured to allow a building temperature in the building to deviate from the comfort temperature by a first amount when the mobile device crosses from inside the geofence to outside the geofence; and
the controller is further configured to determine a second amount specifying how far the building temperature is allowed to further deviate beyond the first amount based at least in part on: how long the mobile device remains outside of the geofence irrespective of a distance between the geofence and the mobile device, wherein, to determine the second amount, the controller is configured to increase the second amount by a predetermined amount for each predetermined time period that the mobile device remains outside of the geofence.

8. The HVAC control system of claim 7, wherein the controller is further configured to limit the first amount based at least in part on how quickly the HVAC equipment can drive the building temperature back to the comfort temperature.

9. The HVAC control system of claim 7, wherein the first amount and the second amount collectively can result in a deviation where the HVAC equipment cannot return the building temperature back to the comfort temperature by the time the mobile device returns to the building.

10. The HVAC control system of claim 7, wherein the controller is further configured to store, in the memory, data pertaining to how long the mobile device remains outside the geofence for each of a plurality of days, use the stored data to provide an estimate as to when the mobile device is expected to return to the geofence and use the estimate to adjust the second amount.

11. The HVAC control system of claim 7, comprising an HVAC controller that is located in the building.

12. The HVAC control system of claim 7, comprising a cloud-based server that is located outside of the building and is connected to and issues commands to a building controller within the building.

13. A building automation server for servicing a building, the building automation server comprising:
- an input for receiving a geofence status of one or more mobile devices that are associated with the building, wherein the geofence status includes whether the one or more mobile devices are inside a geofence or outside a geofence defined for the building;
- an output for outputting a command to a building controller in the building;
- a controller operably coupled to the input and the output, the controller configured to keep track of the geofence status for each of the one or more mobile devices;
- the controller further configured to output a command via the output to change a set point of the building controller to an energy saving set point upon detecting that all of the one or more mobile devices are outside of the geofence and to output a command via the output to change the set point of the building controller to a comfort temperature set point upon detecting that at least one of the one or more mobile devices are inside the geofence;
- the controller further configured to determine how far to further deviate from the energy savings set point based at least in part on how long the one or more mobile devices remain outside the geofence irrespective of a distance between the geofence and the one or more mobile devices, wherein, to determine how far to further deviate from the energy savings set point, the controller is configured to, further deviate from the energy savings set point by a predetermined amount for each predetermined time period that the one or more mobile devices remain outside of the geofence.

14. The building automation server of claim 13, configured to output commands to an HVAC controller in the building.

15. The building automation server of claim 14, wherein the energy savings set point is based at least in part on how far outside of the geofence a closest mobile device of the one or more mobile devices is located.

16. The building automation server of claim 15, wherein the controller is further configured to receive information, via the input, pertaining to an adaptive intelligent recovery (AIR) ramp rate from the HVAC controller.

17. The building automation server of claim 16, wherein the controller is further configured to limit how far the energy savings set point can vary from the comfort temperature set point based at least in part on the AIR ramp rate.

18. The building automation server of claim 17, wherein the controller is further configured to provide the HVAC controller with the energy savings set point.

* * * * *